United States Patent [19]

Pitt et al.

[11] Patent Number: 4,485,679

[45] Date of Patent: Dec. 4, 1984

[54] FLUID FLOWMETER

[75] Inventors: Gillies D. Pitt, Saffron Walden; Roger J. Williamson, Harlow; David N. Batchelder, London, all of England; Arulanandam M. Prabakaran, Ayanavaram, India

[73] Assignee: ITT Industries, Inc., New York, N.Y.

[21] Appl. No.: 446,158

[22] Filed: Dec. 2, 1982

[30] Foreign Application Priority Data

Dec. 10, 1981 [GB] United Kingdom ................ 8137226

[51] Int. Cl.³ .............................................. G01F 1/32
[52] U.S. Cl. ................................................. 73/861.22
[58] Field of Search .......................... 73/861.22, 861.24

[56] References Cited

U.S. PATENT DOCUMENTS

| | | | |
|---|---|---|---|
| 3,589,185 | 6/1971 | Burgess | 73/861.22 |
| 3,759,096 | 9/1973 | White | 73/861.22 |
| 4,074,571 | 2/1978 | Burgess | 73/861.24 |
| 4,350,047 | 9/1982 | Dewey, Jr. et al. | 73/861.22 |

FOREIGN PATENT DOCUMENTS

| | | | |
|---|---|---|---|
| 55-469 | 1/1980 | Japan | 73/861.22 |
| 55-23497 | 2/1980 | Japan | 73/861.22 |
| 56-24519 | 3/1981 | Japan | 73/861.22 |
| 56-57913 | 5/1981 | Japan | 73/861.22 |
| 1500704 | 2/1978 | United Kingdom | 73/861.22 |

Primary Examiner—Herbert Goldstein
Attorney, Agent, or Firm—T. E. Kristofferson; A. D. Stolzy

[57] ABSTRACT

A vortex flowmeter having a double bluff body arrangement whereby vortices are generated at a rate corresponding to the fluid flow velocity. The upstream body and the downstream body together interact with the fluid stream to generate vortices. The arrangement introduces a relatively low blocking factor in comparison to simple bluff body arrangements. Vortex sensors are located between the bodies and downstream of the second body a distance between three and five times the diameter of that body.

5 Claims, 5 Drawing Figures

VARIATION OF DOWN STREAM LOCATION
DUE TO VARIATION IN FLOW

FLUID FLOWMETER

BACKGROUND OF THE INVENTION

This invention relates to fluid flowmeters, and in particular to flowmeters of the vortex shedding type.

PRIOR ART STATEMENT

Vortex shedding is a phenomenon which occurs when a fluid flows past a bluff (non-streamlined) body. Boundary layers of a slow moving viscous fluid are formed along the outer surface of the body. The layers become detached and roll up into vortices because the body is not streamlined and the fluid flow cannot therefore follow the contours of the body. When a bluff body is placed in a uniform stream of fluid, two separated shear layers are formed. There is one on each side of the body, the vorticity of the two layers being opposite. A mutual interaction occurs between the two layers and, in the absence of disturbing influences, a stable pattern of alternating (i.e. of the opposite rotational sense) vortices is formed downstream of the body. This phenomenon is well known in the art and is commonly called a vortex street. In a truly uniform flow around certain bluff body shapes, this vortex shedding shows a periodicity that is, as far as can be measured, purely monotonic, the frequency being linearly related to the fluid velocity.

Various flowmeters employing this principle have been described in the prior art. Typically, they comprise a bluff body disposed in a fluid stream and means arranged downstream of the body for detecting the vortices produced by the interaction of the fluid with the body.

Unfortunately, the flow of fluid in a pipe is often far from uniform and a number of disturbing factors are therefore present. Such flow conditions introduce an amplitude modulation of the vortex intensity and can thus lead to errors in the interpretation of the output signal.

It is well known in the art that the intensity of the amplitude modulation is determined partly by the relative dimensions of the bluff body and the pipe in which it is mounted. A bluff body is the basic requirement for the generation of vortices and it is the "degree of bluffness" of the body that introduces a pressure loss. A relatively streamlined body introduces only a small pressure loss but at the same time generates extremely weak vortices the magnitude of which are of the same order as the disturbances due to fluid turbulence. Such vortices are thus lost in the background noise.

In order to produce vortices of a magnitude sufficient to ensure reliable detection, the leading or upstream face of the body must be relatively non-streamlined. It will be appreciated that the magnitude of the vortices will correspond to the size of the upstream face of the body and, at the same time, the larger the body the greater the pressure loss. Thus, when designing a bluff body for a flowmeter it is necessary to provide a balance between an acceptable vortex magnitude and an acceptable pressure loss. Considerable research has been carried out to determine the optimum size and shape of the vortex generating body having regard to the pipe diameter, the fluid flow rate and the effects of the turbulence introduced by the body.

It has been found empirically that the optimum ratio of body diameter to pipe diameter is about 1:3 and many commercial meters employ a ratio of this order. However, employing a bluff body of such a relatively large size introduces a relatively large blocking factor, thus causing an energy loss through the meter. In some applications this energy loss may be unacceptable. Furthermore, at high flow rates the measurement is disturbed by cavitation effects.

SUMMARY OF THE INVENTION

According to the present invention there is provided a vortex flowmeter in which the vortex generation means comprises a first bluff body, and a second bluff body disposed downstream of the first body, the arrangement being such that vortices are generated by the combined interaction of the fluid stream with the first and second bluff bodies.

It has been discovered that a pair of bluff bodies disposed in a moving fluid produce a far more stable vortex street than is obtained from a conventional single bluff body arrangement. It has also been discovered that such a double bluff body arrangement produces a lower energy loss than is experienced with a single body.

It has also been found that the double body arrangement has a fluid flow characteristic in the space between the bodies such that there is a small region of high vorticity. By suitably locating a vortex detector such that vortices are detected in this region a highly sensitive flowmeter is obtained.

BRIEF DESCRIPTION OF THE DRAWINGS

In the accompanying drawings which illustrate exemplary embodiments of the present invention.

DESCRIPTION OF THE PREFERRED EMBODIMENT

Figure 1:
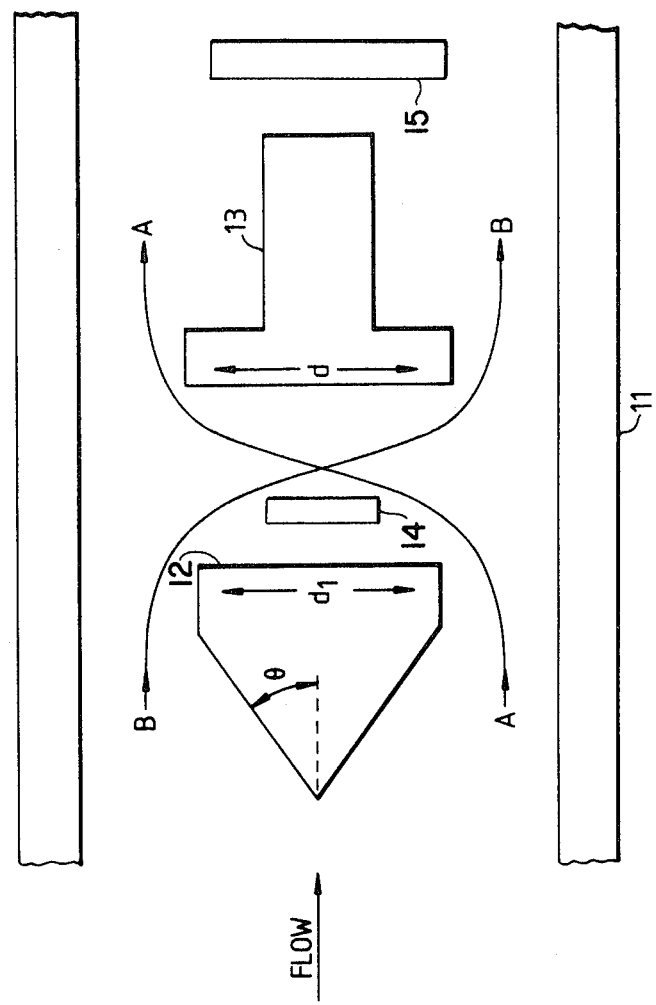
FIG. 1 is a diagrammatic view of a double bluff body vortex flowmeter constructed in accordance with the present invention.

Referring to FIG. 1, the flowmeter shown is mounted in a pipe 11 and includes first and second bodies, 12 and 13, mounted respectively upstream and downstream in the pipe 11, the direction of fluid flow being indicated by the arrows A and B. As can be seen, the first (upstream) body 12 presents a relatively streamlined face to the impinging fluid and thus modifies the fluid interaction with the bluff upstream face 14 of the second (downstream) body 13. Surprisingly, we have found that this shielding does not reduce substantially the magnitude of the vortices that are shed from the downstream body 13 by the interaction of the fluid therewith.

Conventional vortex detecting means are provided both at 14 between bodies 12 and 13 and at 15 downstream of body 13. Vortex detecting means 15 are located downstream of body 13 by a distance between three and five times the diameter of body 13.

As shown in the drawing, the upstream body 12 may be wedge-shaped in cross-section and disposed with the apex of the wedge directed upstream in the fluid flow. The downstream, non-streamlined, body 13 is advantageously substantially T-shaped in cross-section and its spacing from the body 12 is adjusted so as to provide maximum vortex magnitude with minimum pressure loss. The spacing between the bodies 12 and 13 will depend on their shapes and dimensions. Furthermore, the shapes of the bodies 12 and 13 are not restricted to those shown in FIG. 1. The upstream body 12 presents a relatively streamlined profile to the fluid flow and the downstream body 13 is sufficiently bluff and suitably spaced from the upstream body 12 to generate measurable vortices. Experience with double bluff bodies such as bodies 12 and 13 has indicated that "in-body" detection (in between the two bluff bodies) produces better signals than those obtained further downstream. These signals were found to be very close to the second bluff body 13, their exact location depending upon the diameter of the first bluff body 12. We have found that the region between the two bodies 12 and 13 is subject to alternate fluid oscillations as the fluid stream changes back and forth between the paths indicated by the arrows A and B. This fluid flow characteristic provides a small region, typically about 1 mm. in dimension, between the bodies within which high intensity vortices are produced. By placing a vortex detector precisely in this region, a highly sensitive instrument is obtained. The precise location of this highly sensitive detection region has been found to be substantially unaffected by flow rate.

Figure 2:
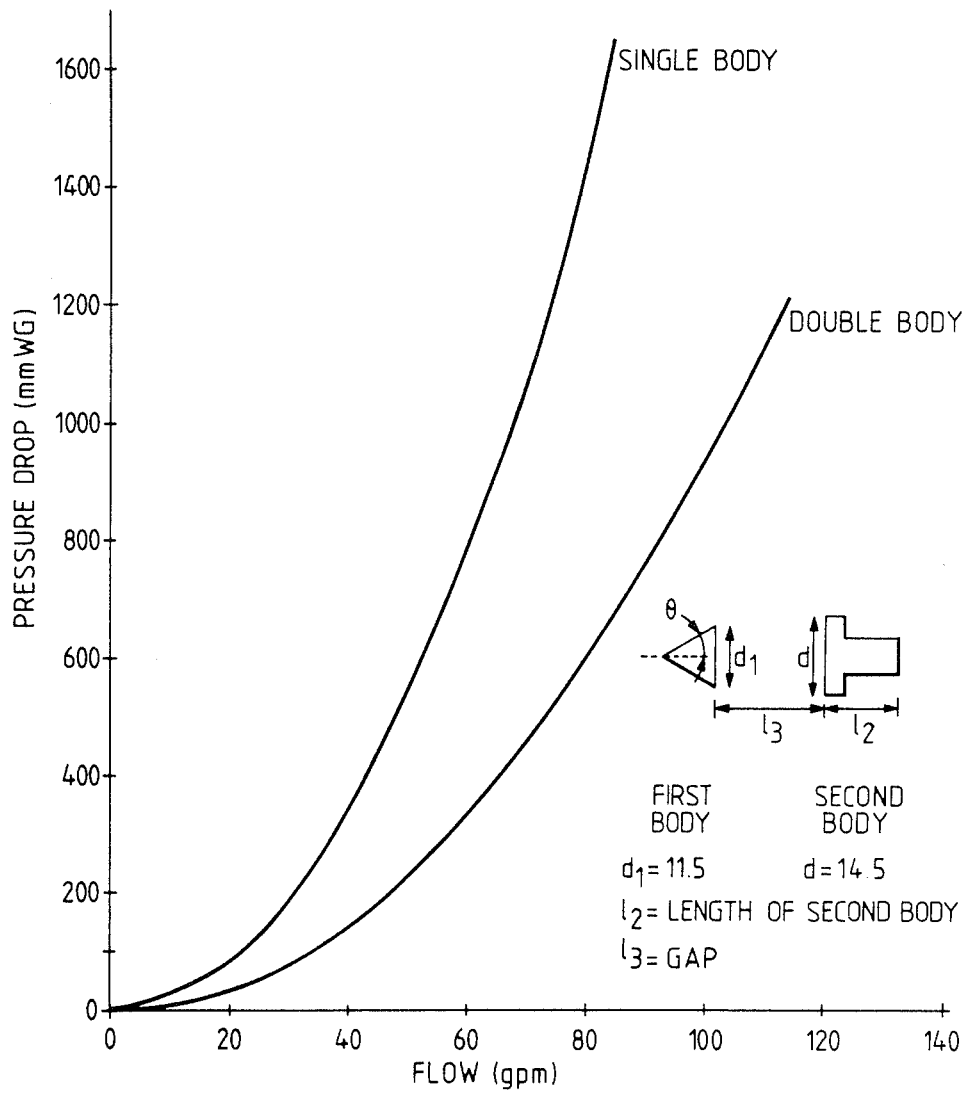
FIG. 2 is a graph of pressure versus flow.

As can be seen from FIG. 2, the effective blocking factor of the two body arrangement is substantially less than that of a conventional single body arrangement of similar dimensions. At low flow rates this reduction can be over 50%.

The blocking factor will of course depend on the shapes, dimensions and spacing of the two bodies and will normally be determined in each individual case by experiment.

Figure 3:
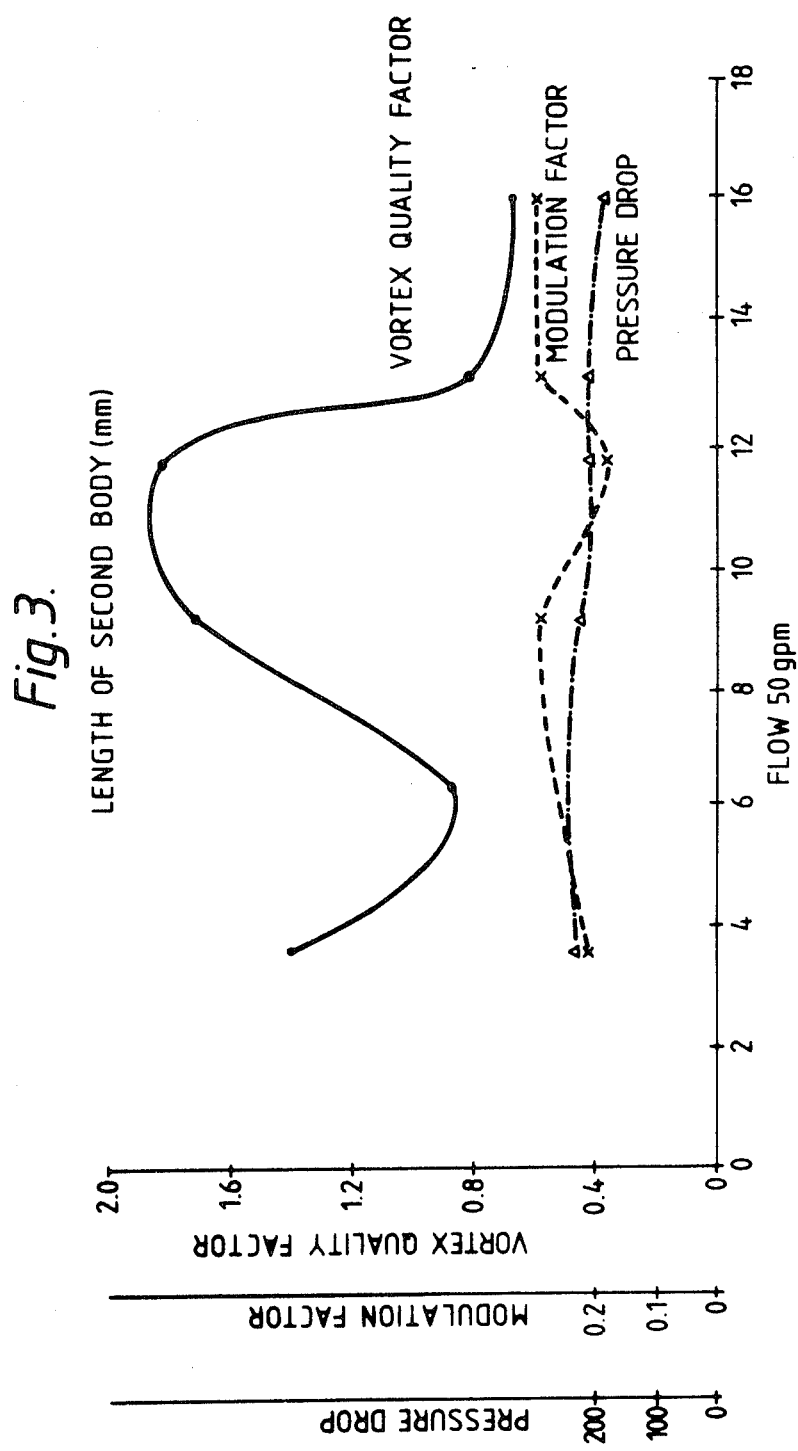
FIG. 3 is a graph of three factors concerning operation.

By way of example FIG. 3 illustrates the manner in which the vortex quality factor, that is the signal to noise ratio, is affected by the length of the second body 13. For a body diameter of 14.5 mm. it can be seen that there is an optimum length of between 10 and 12 mm. It can also be seen that the blocking factor or pressure drop of the double body arrangement is substantially independent of the length of the second body 13.

Figure 4:
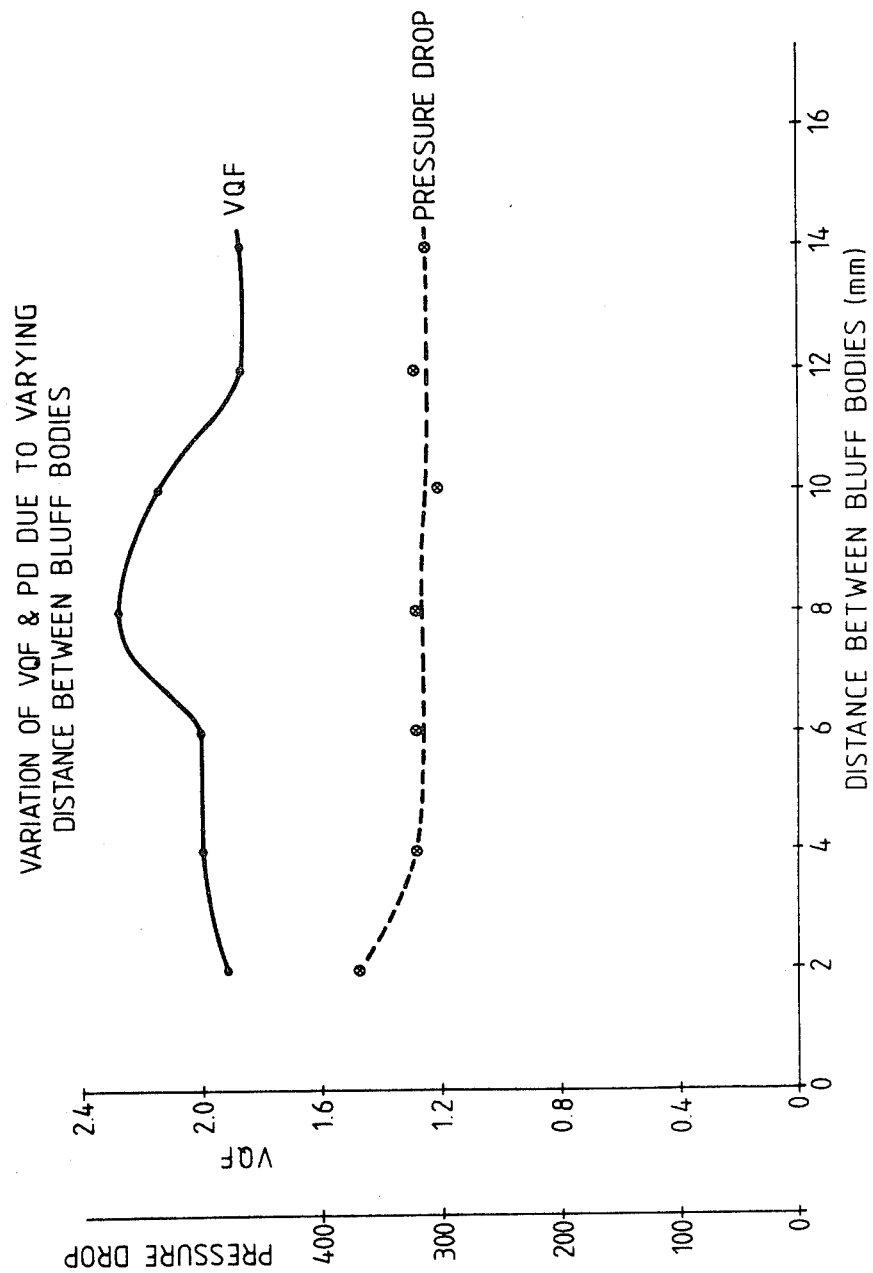
FIG. 4 is a graph that illustrates the relationship between body spacing and a vortex quality factor.

FIG. 4 illustrates the effect of the spacing of the two bodies 12 and 13 on the vortex quality factor. Any sensor that is used for vortex detection will register a background noise signal, usually 'pink' noise, on which the vortex signals are superimposed. The vortex quality factor is a measure, derived experimentally, of the signal to noise ratio of the vortex signals. As can be seen from FIG. 4, there is an optimum spacing at which the vortex quality factor, measured in arbitrary units, has a maximum value. The variation in quality factor is not large but typically reaches a maximum value for an inter-body spacing of 7 to 9 mm. for first and second bodies having diameters of 11.5 mm. and 14.5 mm., respectively. In general we have found that the optimum body spacing corresponds to the diameter of the first body 12.

We have found that the vortex street generated from a pair of bluff bodies is more stable and enhanced than that obtained with a single body. The shedding frequency depends primarily on the diameter of the larger of the two bodies. It was found advantageous to keep the diameter of second body 13 larger than that of the first one, thus utilizing the second body 13 as the primary generator of the vortex street. The first body 12 is thought to act somewhat as a flow straightener and its dimensions bear a relationship to the diameter of the second body 13.

The diameter of the second body 13 influences the frequency of shedding and the ratio d/D (where d=bluff body diameter and D=diameter of the pipe) determines the magnitude of the vortices formed. A ratio of d/D=0.26/0.27 has been found to produce vortices of optimum magnitude.

Having fixed the optimum d/D ratio, the other dimension which has an effect on the formation of vortices is the width m of the second bluff body 13. The optimum width ratio has been found to be m/d=0.21.

Three parameters should be taken into account. In the construction of the first bluff body 12 (FIG. 1), the diameter (d1) thereof, the half angle of divergence ($\theta$) and the shape of the leading edge are important. As the diameter of the upstream bluff body 12 is reduced, the quality of the signals improve considerably till a ratio d1/d=0.55 is reached and beyond this ratio the signal quality deteriorates. Experiments conducted for bluff bodies of different d1's to ascertain the most suitable distance between the two bodies have shown that the optimum distance is the diameter d1 of the first bluff body. With a ratio d1/d of 0.55 the best values for $\theta$ were found to be 19° to 20°. The reason may be that wider angles disperse the fluid beyond the leading edges of the second body such that it can not effectively act as a bluff body. Very acute angles reduce the angle of divergence of the fluid and thus the effectiveness of the first body. Therefore the tandem body arrangement becomes more or less equivalent to a single body.

Figure 5:
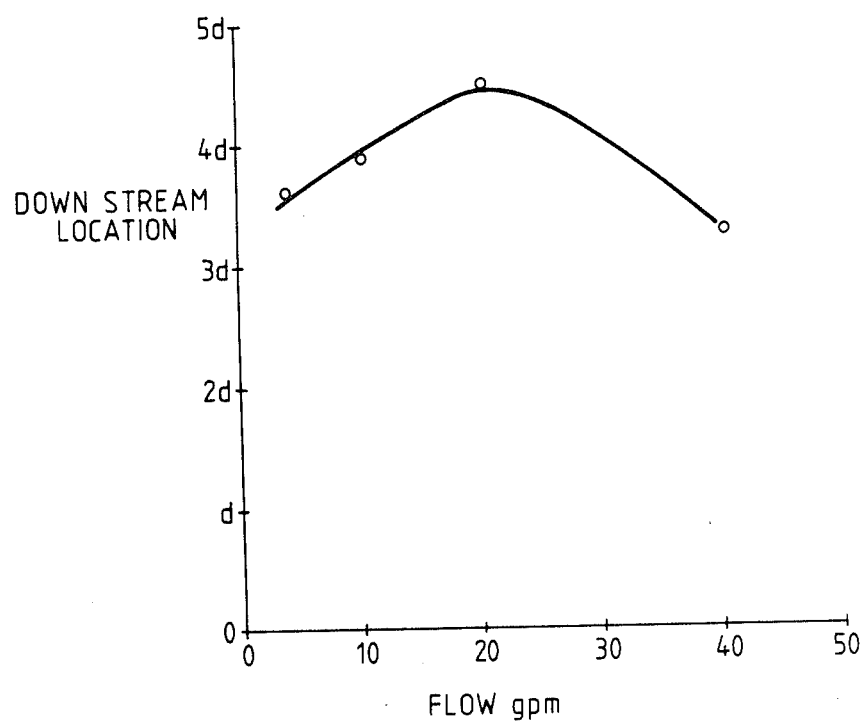
FIG. 5 is a graph that illustrates the relationship between the position of maximum downstream vortex intensity and fluid flow rate.

Although we prefer to detect vortices in the high intensity region between the two bodies, some applications may require the provision of a detector arrangement downstream of the double body arrangement. It is of course desirable to site such a detector within or adjacent a region in which maximum vortex intensity is produced. The position of this region varies with flow rate, as illustrated in FIG. 5, but typically we have found that the positioning of a detector downstream of the body 13 by a distance between 3 and 5 times the diameter d of that body is appropriate.

In the foregoing description no mention has been made as to the nature of the vortex detector. Examples of types of suitable detectors are opto-mechanical, pressure, thermal and fiber optic.

It will be apparent that the vortex flowmeter arrangements described herein may be employed for the measurement of both liquid and gas flow rates.

What is claimed is:

1. A vortex flowmeter comprising: a pipe section through which a fluid flow is directed; first and second bodies disposed in the fluid path in said pipe section and in respective upstream and downstream positions; means for detecting vortices generated by the interaction of the fluid flow with the combination of the two bodies, said vortices being generated at a rate proportional to the fluid flow rate; means for translating said vortex frequency into a measure of the fluid flow rate, said first bluff body being tapered and pointing upstream, said second bluff body having a substantially flat surface normal to the flow; vortex detecting means disposed between the first and second bodies; and vortex detecting means disposed downstream of the second body by a distance between three and five times the diameter of that body.

2. A flowmeter as claimed in claim 1, wherein said first body is wedge shaped in cross-section and is disposed with the apex of the wedge directed in an upstream direction.

3. A flowmeter as claimed in claim 2, wherein said wedge has a half angle of 19° to 20°.

4. A flowmeter as claimed in claim 3, wherein said second body is T-shaped in cross-section and is disposed with the tail of the T directed in a downstream direction from the cross.

5. A flowmeter as claimed in claim 4, wherein the diameter of the second body is from 0.26 to 0.27 times the diameter of the pipe section.

* * * * *